United States Patent [19]
Cooper et al.

[11] Patent Number: 5,726,783
[45] Date of Patent: Mar. 10, 1998

[54] OPTICAL FIBRE COMMUNICATION SYSTEM

[75] Inventors: Anthony James Cooper; Simon Charles Fenning; Michael Harry Reeve; Lawrence Bickers; Paul Adrian Rosher, all of Ipswich, England

[73] Assignee: British Telecommunications public limited company, London, England

[21] Appl. No.: 284,045

[22] Filed: Aug. 1, 1994

Related U.S. Application Data

[63] Continuation of Ser. No. 890,586, filed as PCT/GB90/01916, Dec. 7, 1990, published as WO91/09478, Jun. 27, 1991, abandoned.

[30] Foreign Application Priority Data

Dec. 8, 1989 [GB] United Kingdom ............ 8927783

[51] Int. Cl.$^6$ ................................................. H04J 14/02
[52] U.S. Cl. ................................................. 359/125
[58] Field of Search ............................ 359/125, 128, 359/132, 121, 124; 455/4.2; 348/7; H04N 7/173

[56] References Cited

U.S. PATENT DOCUMENTS

| | | | |
|---|---|---|---|
| 3,912,876 | 10/1975 | Muller | 359/128 |
| 4,475,123 | 10/1984 | Dumbauld | 348/6 |
| 4,491,983 | 1/1985 | Pinnow | 359/125 |
| 4,710,914 | 12/1987 | Robieux | 359/125 |
| 4,745,592 | 5/1988 | Gabriagues | 359/125 |
| 4,797,879 | 1/1989 | Habbab | 359/121 |
| 4,891,694 | 1/1990 | Way | 359/125 |
| 5,058,102 | 10/1991 | Heidemann | 359/125 |
| 5,136,411 | 8/1992 | Paik | 359/125 |
| 5,289,302 | 2/1994 | Eda | 359/124 |
| 5,319,485 | 6/1994 | Yasui | 359/124 |
| 5,323,255 | 6/1994 | Sierens | 359/135 |

OTHER PUBLICATIONS

American Heritage Dictionary, 2nd College Edition, Definition of Dynamic/Dynamically, 1982.

IBM Tech Disclosure, "Wavelength Division Multiaccess Network Using Component Centralization, LO Injection Locking and Homodyne Detection" vol. 30, #9, Feb. 1988 pp. 262–267.

"Proceedings," The International Symposium on Subscriber Loops and Services, Boston, US, 11–16 Sep. 1988, IEEE, Plc., Kanno et al: Fiber optic digital video signals transport for broadband subscriber network, pp. 222–229.

Technical Digest, 13th European Conference on Optical communication, vol. 3, 13–17 Sep., (Helsinki, SF), Baack et al: "Coherent Multicarrier techniques in future broadband communications networks," pp. 78–87.

Technical Digest, 13th European Conference on Optical Communication, vol. 1, 13–17 Sep. 1987, (Helsinki, SF), Caspar et al: "Automatic switching system in optical hetrodyne technique," pp. 317–320.

Journal of Lightwave Technology, vol. 7, No. 6, Jun. 1989, IEEE, Plc., (New York, US); Darcie et al: "Wide-band lightwave distribution system using subcarrier multiplexing," pp. 997–1005.

Electronics Letters, vol. 21, No. 25, 5 Dec. 1985, (Stevenage, GB), Bachus et al: "Coherent optical–fibre subscriber line," pp. 1203–1205.

*Primary Examiner*—Leslie Pascal
*Attorney, Agent, or Firm*—Nixon & Vanderhye P.C.

[57] ABSTRACT

An optical fibre communications system includes an exchange (E) and a plurality of subscriber lines (1). The exchange (E) provides a plurality of services in different subcarrier frequencies (6,8,9,10). Each subscriber line (1) is provided with terminal apparatus (5) operable at different subscriber frequencies, and a control (11) at the exchange (E) tunes the terminal apparatus to transmit and/or receive on a particular frequency in response to a request. The request may be a signal from the terminal apparatus (5), or an incoming service request addressed to the particular terminal apparatus.

25 Claims, 2 Drawing Sheets

OPTICAL FIBRE COMMUNICATION SYSTEM

This is a continuation of application Ser. No. 07/890,586, filed as PCT/GB90/01916, Dec. 7, 1990, published as WO91/09478, Jun. 27, 1991, now abandoned.

BACKGROUND

I. Field of the Invention

This invention relates to an optical fibre communications system, and to a method of controlling the provision of services on such a system.

II. Related Art and other Consideration

In optical transmission systems, the radiation used is not necessarily in the visible region of the electromagnetic spectrum, and so the words 'optical' and 'light' when used in this specification are not to be interpreted as implying any limitation to the visible spectrum. For example, the wavelengths preferred for transmission through silica optical fibres are in the infra red region, because the loss minima of silica fibres occurs at 1.3 and 1.5 microns.

Optical transmission systems may be utilized to distribute various services such as telephony, video channels, facsimile and data transmission. In general, the primary service, at least as presently measured in terms of subscriber lines, is telephony. Various techniques are available for separating lines from one another, and also for separation of different services, for example the transmitted signals may be time, wavelength or subcarrier frequency multiplexed.

A disadvantage of time division multiplexing is that it requires a very wide bandwidth. Moreover, expensive receivers and transmitters are required, together with a complex protocol for providing customers with a range of services. Therefore, it is not an attractive financial proposition for situations where, for example, only a telephony line is initially required and there is only a limited likelihood of additional services being required subsequently. Likewise, wavelength division multiplexing, with different services on different wavelengths, would also require additional optical transmitters and receivers to be installed for an expansion of service on additional channels.

There has been much recent interest in subcarrier frequency multiplexing for optical transmission systems, and in particular in subcarrier frequency multiplexing utilizing microwave subcarrier frequencies. With such an arrangement, the electronics operating at the microwave subcarrier frequency are now of a proven reliability and low cost; and, with multiplexing possible, it has been proposed to utilize subcarrer multiplexing with the subscriber receiver tuned to a particular subcarrier frequency.

The basic starting point for a transmission network is usually the provision of a telephony link. Initially, supply of additional services over the link may not be required, even though optical fibre has a sufficiently larger bandwidth to provide more services. The invention relates to a flexible system which can expand services as demand arises, without the need for installation of additional transmitter and receiver equipment.

SUMMARY

The present summary provides an optical fibre communications system in which a plurality of subscriber lines are connected to exchange apparatus capable of providing a range of services on different subcarrier frequencies, each of the subscriber lines being provided with a respective terminal apparatus operable at a plurality of said different subcarrier frequencies, and the exchange apparatus being provided with control means for governing access of individual terminal apparatus to given subcarrier frequencies.

Advantageously, the control means is such that access of a given terminal apparatus to a given subcarrier frequency is governed by selectively enabling that terminal apparatus to operate on the given subcarrier frequency.

The control means may also be such that a predetermined subcarrier frequency is enabled for a restricted time period. Preferably, each terminal apparatus is provided with means for requesting the exchange apparatus for service frequency allocation.

The invention also provides a method of controlling the provision of services in an optical fibre communications network constituted by exchange apparatus and a plurality of subscriber lines, the method comprising the steps of providing a range of services of different subcarrier frequencies, providing each of the subscriber lines with a respective terminal apparatus operable at a plurality of said different subcarrier frequencies, and tuning each terminal apparatus to govern access to said different subcarrier frequencies by control signals from the exchange apparatus.

BRIEF DESCRIPTION OF THE DRAWINGS

The invention will now be described in greater detail by way of example, with reference to the accompanyinng drawings, in which.

DETAILED DESCRIPTION OF THE DRAWINGS

Figure 1:
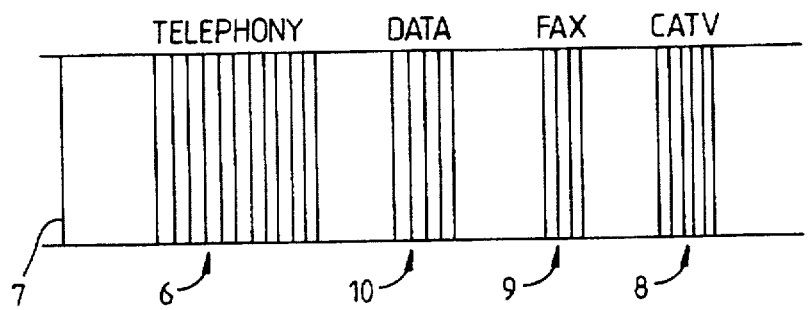
FIG. 1 is a frequency diagram schematically illustrating the subcarrier frequency multiplexing scheme used in the system of FIG. 2.
Figure 2:
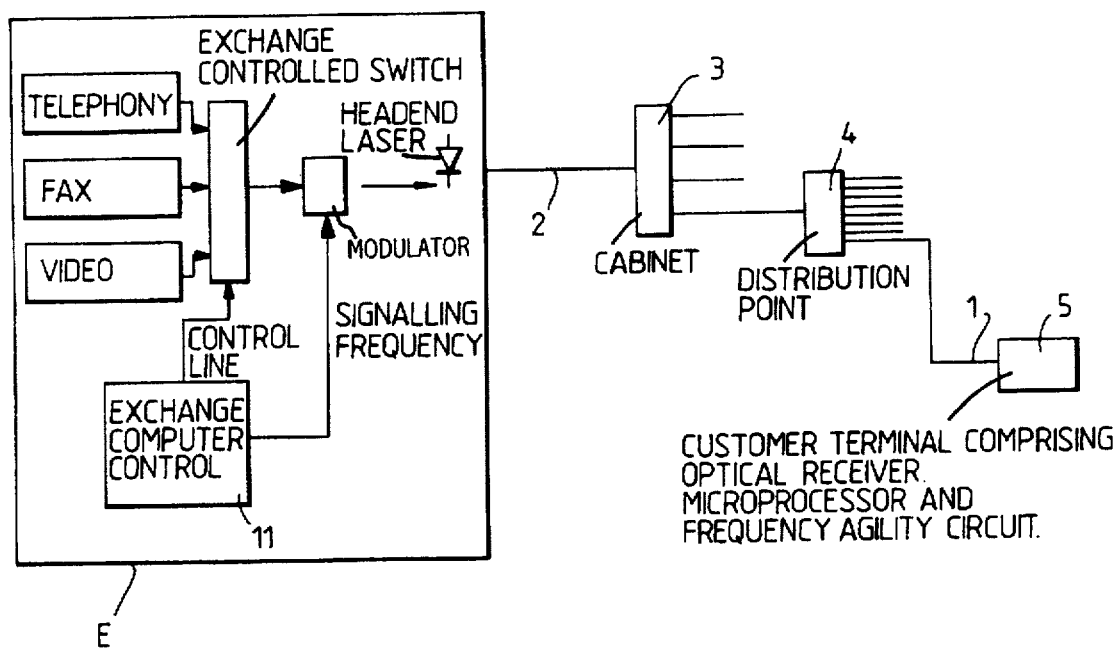
FIG. 2 is a schematic diagram of an optical fibre communications system constructed in accordance with the invention.

Referring to the drawings, FIG. 1 shows a schematic subcarrier frequency diagram at a particular optical operating frequency in the 1300 nm or 1500 nm transmission windows of silica fibre. It will be realised that a similar subcarrier multiplexing scheme can operate at other optical frequencies, thereby providing an enormous range of available channels. Initially, the service provided will be telephony, for example on a passive optical network (PON) such as that illustrated in FIG. 2, in which 32 telephony subscriber lines 1 are provided from an exchange E. A single fibre 2 leaves the exchange E, and is split four ways at a cabinet 3, and eight ways at each of four distribution points 4 (only one of which is shown in FIG. 2). Each of the 32 lines 1 terminates at a respective subscriber apparatus (transmitter 100/receiver 102) 5 which is tuned at 102a to a particular one of the subscriber telephony subcarrier frequencies 6 at 102b, and also receives control signals on a common control frequency 7. The control signals address the subscriber apparatus 5, and tunes them at 102c to receive only their allocated subscriber frequencies. Return information, from the subscriber end to the exchange E (for example by automatic repeat request signalling), may also be given (at 100) on a common control frequency, for example to indicate faults or tampering. At the same time, or subsequently, additional services such as video channels (CATV), high definition facsimile lines and data channels referenced respectively 8, 9 and 10, are provided from the exchange E on to the PON at their own unique subcarrier frequencies. Requests for additional services can be made (at 103) from any of the subscribers to the exchange E. Within the exchange E, the requests for service allocation are microprocessor controlled by exchange computer control 11, so that the subscriber at apparatus 5 simply dials a request code, the microprocessor at 11 checks for service availability (for example whether there is a high definition facsimile line available), makes a service frequency allocation, and sends out the frequency enabling control signal addressed to the subscriber.

Figure 3:
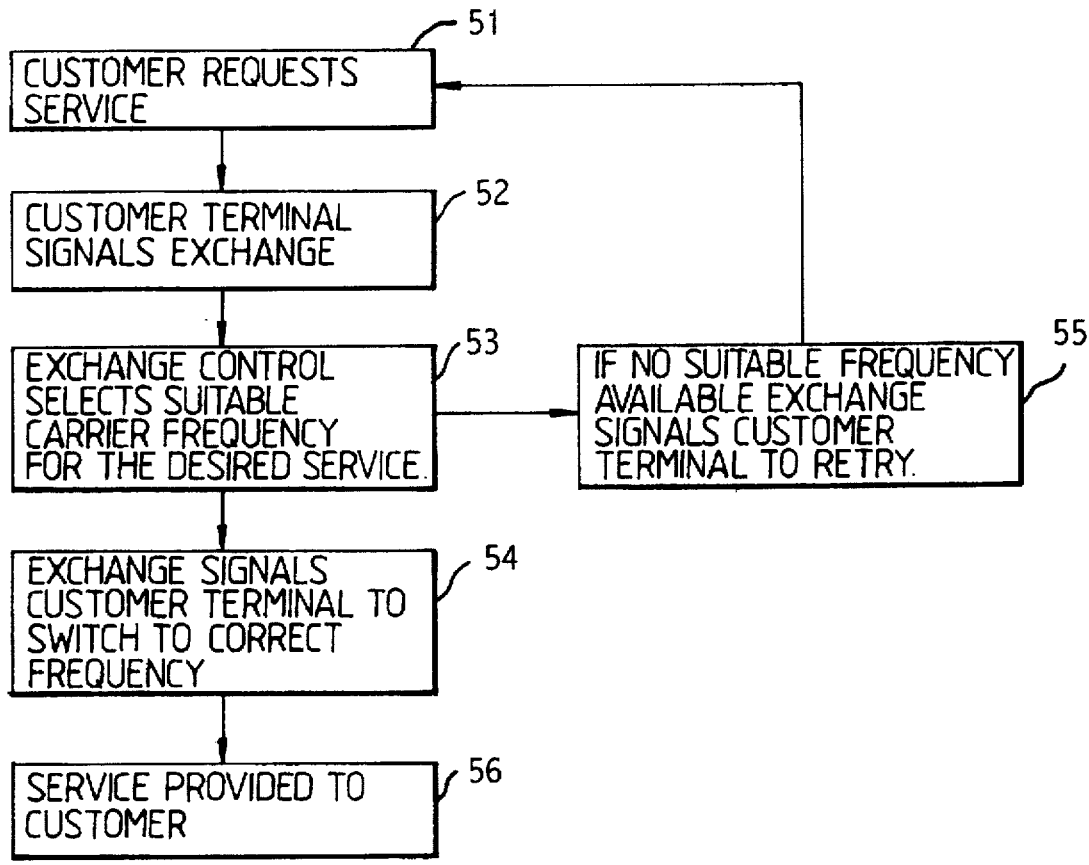
FIG. 3 is a flow diagram of a customer-initiated service request.

FIG. 3 illustrates an additional service request procedure. When a subscriber wishes to receive an additional service, he or she makes a request at step 51 for the service to the exchange E, the subscriber apparatus 5 signalling to the exchange at step 52. This signalling may be on the control frequency 7, or another control frequency. At step 53 the exchange E, the computer control (see FIG. 2) determines whether the requested service is one that is on a frequency that can be made generally available, such as reception of CATV, or whether the service requires a unique frequency such as a high definition facsimile service. Having estabished the type of service required, the computer control 11 allocates a subcarrier frequency, and at step 54 a control signal is sent out on the control frequency that enables the subscriber apparatus 5 to access the subfrequency of the requested service. In some instances, when unique frequencies are required, there may not be a suitable frequency available, in which case the exchange E at step 55 sends control signals to the subscriber apparatus 5 to retry. The additional service is then provided to the customer at the new subcarrier frequency, at step 56.

Figure 4:
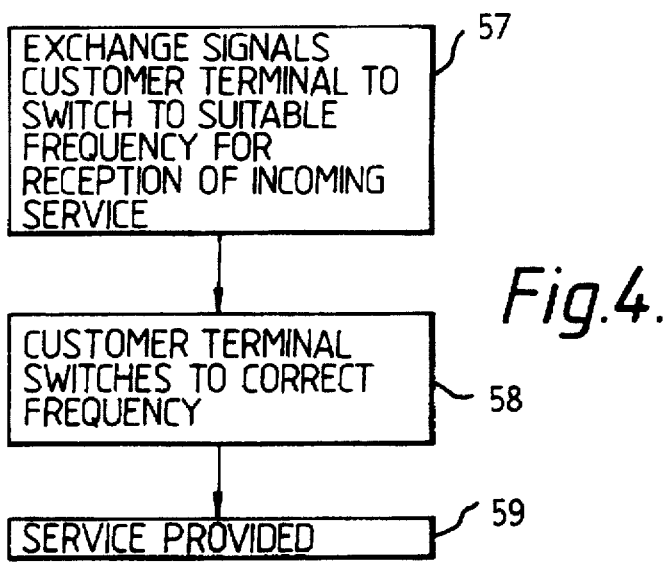
FIG. 4 is a flow diagram of an exchange-initiated service provision.

Tuning to a new subcarrier frequency may also be initiated by the exchange E, for example to enable receipt of an incoming high definition facsimile service. The sequence is then as shown in FIG. 4, the exchange E signalling at step 57 to the subscriber apparatus 5 on the control frequency to tune to the correct frequency for the incoming service, the tuning being carried out at step 58, and the new service provision at the relevant subcarrier frequency commencing at step 59.

Access to a given frequency may be provided on a long term enabling basis, for a predetermined interval, or for the duration of a subsequent use. For example, for access to some or all of the video channels, it is envisaged that general access on a permanent basis would be preferred. However, for data transmission or high definition facsimile, it is envisaged that lines may be leased on a time basis, thereby enabling maximum usage of the channels and removing the need to provide a unique channel for each potential user.

In order that second order subcarrier intermodulation products do not interfere with the services provided, the services may all be provided within a single octave, so that the second intermodulation products fall out of band. Alternatively, the frequencies used for the services may be selected so that they interleave with the intermodulation products.

We claim:

1. An optical fibre communications system in which a plurality of optical fibre subscriber lines are connected to exchange apparatus for providing a range of services on different subcarrier frequencies, each of the optical fibre subscriber lines being provided with a respective terminal apparatus operable at a plurality of said different subcarrier frequencies, and the exchange apparatus being provided with downlink control means for selectively enabling individual terminal apparatus to access given subcarrier frequencies for selectively allocating services to the individual terminal apparatus, the down link control means transmitting control signals to each individual terminal apparatus on a common control channel that is separate from said subcarrier frequencies used for providing said services.

2. A system as in claim 1, wherein the control means causes access of a given terminal apparatus to a given subcarrier frequency to be governed by selectively enabling that terminal apparatus to operate on the given subcarrier frequency.

3. A system as in claim 1, wherein each terminal apparatus is provided with uplink request means for requesting the exchange apparatus for service frequency allocation.

4. A system as in claim 1 wherein the common control channel constituted by a predetermined one of the subcarrier frequencies.

5. A system as in claim 1 wherein the subcarrier frequencies fall within a single octave.

6. A system as in claim 1, wherein the range of services include video channels, high definition facsimile lines, and data channels.

7. Apparatus for distributing a plurality of different communication services over an optical fibre communication network from an exchange apparatus to a plurality of subscribers connected therewith by a respective optical fibre subscriber line, said apparatus comprising:

an exchange apparatus connected to a plurality of subscribers by respective optical fibre subscriber lines;

said exchange apparatus including means for simultaneously modulating said plural different communication services onto respective subcarrier frequencies that are modulated onto a common microwave carrier frequency which is, in turn, modulated onto a single optical frequency optical carrier signal;

remotely-tunable terminal apparatus at each subscriber site connected to its respective optical fibre subscriber line including means for downlink control on a common control communication channel also carried by said optical fibre subscriber lines but separate from said subcarrier frequencies used for providing said services;

said exchange apparatus also including means for controlling the access of each subscriber to particular ones of said different communication services by remotely tuning each terminal apparatus to corresponding subcarrier frequencies in response to downlink control signals from the exchange apparatus over said common control communication channel.

8. Apparatus as in claim 7 wherein each terminal apparatus includes means for requesting access to additional services by sending an uplink request therefor to the exchange apparatus.

9. Apparatus as in claim 7 wherein one of the provided communication services is telephony and said exchange apparatus includes means for initially making said telephony service accessible to said plurality of subscribers but wherein additional services are thereafter made accessible only to selected and authorized terminal apparatus upon request therefor from the respective terminal apparatus.

10. An optical fibre communications system in which a plurality of optical fibre subscriber lines are connected to exchange apparatus for providing a range of services on different subcarrier frequencies, each of the optical fibre subscriber lines being provided with a respective terminal apparatus operable at a plurality of said different subcarrier frequencies, and the exchange apparatus being provided with downlink control means for selectively enabling individual terminal apparatus to access given subcarrier frequencies for selectively allocating services to the individual terminal apparatus, the down link control means transmitting control signals to each individual terminal apparatus on a common control channel that is separate from said subcarrier frequencies used for providing said services, and wherein the control means causes a predetermined subcarrier frequency to be enabled for a restricted time period.

11. A method of controlling the provision of services in an optical fibre communications network constituted by exchange apparatus and a plurality of optical fibre subscriber lines, said method comprising the steps of:

providing a range of services on different subcarrier frequencies, providing each of the optical fibre subscriber lines with a respective terminal apparatus operable at a plurality of said different subcarrier frequencies, initially tuning each terminal apparatus to govern access to said different subcarrier frequencies by downlink control signals from the exchange apparatus, and then selectively enabling individual terminal apparatus by downlink control signals from the exchange apparatus to access given subcarrier frequencies for selectively allocating services to the individual terminal apparatus, the downlink control signals being transmitted to each terminal apparatus on a common control channel that is separate from said subcarrier frequencies used for providing said services, and wherein terminal apparatus access to a particular subcarrier frequency is enabled for a restricted time period.

12. An optical fibre communications system in which a plurality of optical fibre subscriber lines are connected to exchange apparatus capable of providing a range of services on different subcarrier frequencies, each of the optical fibre subscriber lines being provided with a respective terminal apparatus operable at a plurality of said different subcarrier frequencies, and the exchange apparatus being provided with downlink control means for selectively enabling individual terminal apparatus, subsequent to provision of an initial service, to access given subcarrier frequencies for selectively providing an additional service to the individual terminal apparatus.

13. A system as in claim 12, wherein the range of services include video channels, high definition facsimile lines, and data channels.

14. A method for distributing a plurality of different communication services over an optical fibre communication network from an exchange apparatus to a plurality of subscribers connected therewith by a respective optical fibre subscriber line, said method comprising:

simultaneously modulating said plural different communication services onto respective sub-carrier frequencies that are modulated onto a common microwave carrier frequency which is, in turn, modulated onto a single optical frequency optical carrier signal;

providing remotely-tunable terminal apparatus at each subscriber site connected to its respective optical fibre subscriber line for downlink control on a common control communication channel also carried by said optical fibre subscriber lines but separate from said subcarrier frequencies used for providing said services;

controlling the access of each subscriber to particular ones of said different communication services by remotely tuning each terminal apparatus to corresponding subcarrier frequencies in response to downlink control signals from the exchange apparatus over said common control communication channel, and wherein said controlling step causes remote tuning of a terminal apparatus to a predetermined subcarrier frequency for only a restricted time period.

15. A method of controlling the provision of services in an optical fibre communications network constituted by exchange apparatus and a plurality of optical fibre subscriber lines, the method comprising the steps of:

providing a range of services on different subcarrier frequencies, providing each of the optical fibre subscriber lines with a respective terminal apparatus operable at a plurality of said different subcarrier frequencies, initially tuning each terminal apparatus to govern access to said different subcarrier frequencies by control signals from the exchange apparatus for provision of initial services to each terminal apparatus, and then selectively enabling individual terminal apparatus to access given subcarrier frequencies for selectively allocating additional services to the individual terminal apparatus.

16. A method as in claim 15, wherein the range of services include video channels, high definition facsimile lines, and data channels.

17. A method for distributing a plurality of different communication services over an optical fibre communication network from an exchange apparatus to a plurality of subscribers connected therewith by a respective optical fibre subscriber line, said method comprising:

simultaneously modulating said plural different communication services onto respective sub-carrier frequencies that are modulated onto a common microwave carrier frequency which is, in turn, modulated onto a single optical frequency optical carrier signal;

providing remotely-tunable terminal apparatus at each subscriber site connected to its respective optical fibre subscriber line for downlink control on a common control communication channel also carried by said optical fibre subscriber lines but separate from said subcarrier frequencies used for providing said services;

controlling the access of each subscriber to particular ones of said different communication services by remotely tuning each terminal apparatus to corresponding subcarrier frequencies in response to downlink control signals from the exchange apparatus over said common control communication channel.

18. A method as in claim 17 further comprising:

each terminal apparatus requesting access to additional services by sending an uplink request therefor to the exchanged apparatus.

19. A method as in claim 17 wherein one of the provided communication services is telephony which is initially made accessible to said plurality of subscribers and wherein additional services are thereafter made accessible only to selected and authorized terminal apparatus upon request therefor from the respective terminal apparatus.

20. A method of controlling the provision of services in an optical fibre communications network constituted by exchange apparatus and a plurality of optical fibre subscriber lines, said method comprising the steps of:

providing a range of services on different subcarrier frequencies, providing each of the optical fibre subscriber lines with a respective terminal apparatus operable at a plurality of said different subcarrier frequencies, initially tuning each terminal apparatus to govern access to said different subcarrier frequencies by downlink control signals from the exchange apparatus, and then selectively enabling individual terminal apparatus by downlink control signals from the exchange apparatus to access given subcarrier frequencies for selectively allocating services to the individual terminal apparatus, the downlink control signals being transmitted to each terminal apparatus on a common control channel that is separate from said subcarrier frequencies used for providing said services.

21. A method as in claim 20, wherein service request signals are made from the terminal apparatus to the exchange apparatus to request enabling of the terminal apparatus to access the given subcarrier frequencies.

22. A method as in claim 20, wherein terminal apparatus access to a particular subcarrier frequency is enabled on an unrestricted time basis.

23. A method as in claim 20 wherein the subcarrier frequencies fall within a single octave.

24. A method as in claim 20, wherein the range of services include video channels, high definition facsimile lines, and data channels.

25. Apparatus for distributing a plurality of different communication services over an optical fibre communication network from an exchange apparatus to a plurality of subscribers connected therewith by a respective optical fibre subscriber line, said apparatus comprising:

an exchange apparatus connected to a plurality of subscribers by respective optical fibre subscriber lines;

said exchange apparatus including means for simultaneously modulating said plural different communication services onto respective subcarrier frequencies that are modulated onto a common microwave carrier frequency which is, in turn, modulated onto a single optical frequency optical carrier signal;

remotely-tunable terminal apparatus at each subscriber site connected to its respective optical fibre subscriber line including means for downlink control on a common control communication channel also carried by said optical fibre subscriber lines but separate from said subcarrier frequencies used for providing said services;

said exchange apparatus also including means for controlling the access of each subscriber to particular ones of said different communication services by remotely tuning each terminal apparatus to corresponding subcarrier frequencies in response to downlink control signals from the exchange apparatus over said common control communication channel, and wherein said means for controlling causes remote tuning of a terminal apparatus to a predetermined subcarrier frequency for only a restricted time period.

\* \* \* \* \*